(12) United States Patent
Grisolia

(10) Patent No.: US 9,499,981 B2
(45) Date of Patent: Nov. 22, 2016

(54) WATER-MANAGEMENT SYSTEM

(71) Applicant: IBACOS, Inc., Pittsburgh, PA (US)

(72) Inventor: Anthony Grisolia, West Leechburg, PA (US)

(73) Assignee: IBACOS, Inc., Pittsburgh, PA (US)

( * ) Notice: Subject to any disclaimer, the term of this patent is extended or adjusted under 35 U.S.C. 154(b) by 0 days.

(21) Appl. No.: 14/759,506

(22) PCT Filed: May 2, 2014

(86) PCT No.: PCT/US2014/036554
§ 371 (c)(1),
(2) Date: Jul. 7, 2015

(87) PCT Pub. No.: WO2014/179675
PCT Pub. Date: Nov. 6, 2014

(65) Prior Publication Data
US 2016/0024788 A1    Jan. 28, 2016

Related U.S. Application Data

(60) Provisional application No. 61/819,222, filed on May 3, 2013.

(51) Int. Cl.
*E04B 1/70* (2006.01)
*E04C 2/24* (2006.01)
(Continued)

(52) U.S. Cl.
CPC .................. *E04C 2/24* (2013.01); *A47K 3/405* (2013.01); *B32B 5/245* (2013.01); *B32B 5/26* (2013.01);
(Continued)

(58) Field of Classification Search
CPC ............. E04C 2/24; E04C 2/52; B32B 5/26; B32B 5/245; B32B 2262/106; B32B 2262/105; B32B 2262/0276; B32B 2419/04; B32B 2262/103; B32B 2262/101
USPC .............................. 4/580, 559, 605; 52/302.1
See application file for complete search history.

(56) References Cited

U.S. PATENT DOCUMENTS 2,274,765 A * 3/1942 Zalkind ................. A47B 96/201
220/560.01
3,468,086 A * 9/1969 Warner ................... E04D 3/355
156/202

(Continued)

FOREIGN PATENT DOCUMENTS

CN          102102398 A       6/2011
EP            0100231 A2       2/1984
(Continued)

*Primary Examiner* — Basil Katcheves
*Assistant Examiner* — Joshua Ihezie
(74) *Attorney, Agent, or Firm* — The Webb Law Firm

(57) ABSTRACT

A building water-management system (1) includes a base material (6) and fiber composite sheets (10, 20) attached to the base material (6). Each fiber composite sheet (10, 20) includes a fiber core (12) having a first side (13), an opposing second side (14), and a surface layer (16) adhered to the first side (13) of the fiber core (12). Adjacent fiber composite sheets (10, 20) are connected together by a lapped configuration (30) such that the surface layer (16) of a first fiber composite sheet (10) extends from the base material (6) and onto a fiber core (22) of an adjacent second fiber composite sheet (20) and the fiber cores (12, 22) of the first and second fiber composite sheets (10, 20) are aligned next to each other to allow water to flow between the fiber cores (12, 22), thereby forming a continuous water drainage and repellant layer. A shower assembly (90) using the fiber composite sheets (10, 20) is also disclosed.

21 Claims, 14 Drawing Sheets

(51) Int. Cl.
  *A47K 3/40*   (2006.01)
  *B32B 5/24*   (2006.01)
  *B32B 5/26*   (2006.01)
  *E04C 2/52*   (2006.01)
  *A47K 3/00*   (2006.01)
  *A47K 3/28*   (2006.01)
  *E04B 2/70*   (2006.01)

(52) U.S. Cl.
  CPC ............... *E04C 2/52* (2013.01); *A47K 3/008* (2013.01); *A47K 3/282* (2013.01); *B32B 2262/0276* (2013.01); *B32B 2262/101* (2013.01); *B32B 2262/103* (2013.01); *B32B 2262/105* (2013.01); *B32B 2262/106* (2013.01); *B32B 2419/04* (2013.01); *E04B 1/70* (2013.01); *E04B 2/707* (2013.01)

(56) References Cited

U.S. PATENT DOCUMENTS

| | | | |
|---|---|---|---|
| 3,687,021 A * | 8/1972 | Hensley | E01C 3/003 404/31 |
| 4,586,308 A * | 5/1986 | Jennings | E04C 2/526 52/393 |
| 4,692,375 A | 9/1987 | Neubauer et al. | |
| 4,767,321 A | 8/1988 | Chilva | |
| 4,793,802 A | 12/1988 | Chilva | |
| 4,802,843 A | 2/1989 | Chilva | |
| 4,950,532 A | 8/1990 | Das et al. | |
| 5,311,717 A * | 5/1994 | Yount | E04B 2/7457 52/417 |
| 5,348,798 A | 9/1994 | Berghuis et al. | |
| 5,435,021 A * | 7/1995 | Williams | A47K 3/281 4/580 |
| 5,643,989 A | 7/1997 | Van De Grampel et al. | |
| 6,101,642 A * | 8/2000 | Auten | A47K 3/002 4/546 |
| 6,286,879 B1 | 9/2001 | Haque et al. | |
| 6,787,486 B1 * | 9/2004 | Gregg | B28B 1/50 106/668 |
| 7,157,034 B2 | 1/2007 | Bristow et al. | |
| 7,244,501 B2 * | 7/2007 | Raghavendran | B32B 5/28 428/412 |
| 7,255,391 B2 | 8/2007 | Bristow et al. | |
| 7,318,498 B2 | 1/2008 | Woodman et al. | |
| 7,759,267 B2 | 7/2010 | Conover et al. | |
| 2005/0076611 A1 * | 4/2005 | Crawford | E04B 1/762 52/782.1 |
| 2005/0228108 A1 | 10/2005 | Raghavendran | |
| 2006/0099393 A1 | 5/2006 | Woodman et al. | |
| 2006/0240235 A1 | 10/2006 | Boutghrit et al. | |
| 2006/0240242 A1 * | 10/2006 | Raghavendran | B32B 5/02 428/304.4 |
| 2006/0288478 A1 * | 12/2006 | Kenny | A47K 3/30 4/580 |
| 2009/0266025 A1 * | 10/2009 | Toas | E04B 1/80 52/741.4 |
| 2011/0281131 A1 * | 11/2011 | Roberts | B29C 53/066 428/542.2 |

FOREIGN PATENT DOCUMENTS

| | | |
|---|---|---|
| EP | 2365146 B1 | 10/2013 |
| JP | 2000273977 A | 10/2000 |
| JP | 2005232805 A | 9/2005 |

* cited by examiner

WATER-MANAGEMENT SYSTEM

CROSS REFERENCE TO RELATED APPLICATIONS

This application is the United States national phase of International Application. No. PCT/US2014/036554 filed May 2, 2014 and claims priority to benefit of U.S. Provisional Patent Application No. 61/819,222 filed May 3, 2013, the disclosures of which is are hereby incorporated in its their entirety by reference.

BACKGROUND OF THE INVENTION

Field of the Invention

The present invention relates to a building water-management system and a shower assembly that uses a water-management substrate.

Description of Related Art

Water-resistant substrate materials are used for various applications in the construction industry, and, particularly in showers, bathtubs, and other areas that are exposed to a high volume of water. These water-resistant substrate materials help prevent water from seeping into walls, floors and other areas, which, in turn, prevents water from damaging and deteriorating construction materials.

Considerable efforts have been expended to develop water-resistant substrates that can be used in showers and other areas that are exposed to water. However, these materials are expensive to manufacture and time consuming to apply. In addition, these materials are not completely water-resistant allowing water to seep through over time causing water damage.

SUMMARY OF THE INVENTION

In accordance with the present invention, a building water-management system comprises a base material and fiber composite sheets attached to the base material. Each fiber composite sheet includes a fiber core having a first side, an opposing second side, and a surface layer attached to the first side of the fiber core. Adjacent fiber composite sheets are connected together by a lapped configuration such that the surface layer of a first fiber composite sheet, extends from the base material and onto a fiber core of an adjacent second fiber composite sheet and the fiber cores of the first and second fiber composite sheets are aligned next to each other to allow water to flow between the fiber cores, thereby forming a continuous water drainage and repellant layer.

In certain embodiments, at least one of the fiber composite sheets can be a multi-layered fiber composite sheet that includes a first fiber core, a second fiber core, a first surface layer positioned between the first and second fiber cores, and a second surface layer attached to a side of the first fiber core opposite the first surface layer. In such embodiments, a single-layered fiber composite sheet with one fiber core and a surface layer is connected to a multi-layered fiber composite sheet by a lapped configuration such that the surface layer of the single-layered fiber composite sheet extends from the base material and onto the second fiber core of an adjacent multi-layered fiber composite sheet, and the fiber core of the single-layered fiber composite sheet is aligned next to the second fiber core of the multi-layered fiber composite sheet to allow water to flow between the fiber cores, thereby forming a continuous water drainage and repellant layer.

The fiber core can include a porous fiber matrix with a resin material incorporated therein. The porous fiber matrix can be formed from a material chosen from inorganic fibers, metal fibers, glass fibers, plastic fibers including polyester fibers, graphite fibers, carbon fibers, ceramic fibers, mineral fibers, and mixtures thereof. The resin material can be a material chosen from polyolefins, such as polyethylene, polypropylene, and polybutylene, polystyrene, acrylonitryl-styrene, polyesters, polyvinyl chloride, acrylics, and mixtures thereof. Further, the surface layer can include a material chosen from thermoplastic elastomers, silicones, polypropylenes, polyethylenes, polycarbonates, polyurethanes, and mixtures thereof. The surface layer can also be formed from a housewrap.

As indicated, the fiber composite sheet can adhere to various base materials. In certain embodiments, the base material can be a material chosen from wood, tile, plastics, metals, stucco, concrete, concrete blocks, any of these materials having a coating such as a paint, and combinations thereof. As noted above, the fiber composite sheets are configured together to form a continuous water drainage and repellant layer. That is, when attached to the base materials and exposed to water, the porous fiber matrix of the fiber composite sheet captures and drains the water to the surface layer that is repellant to water. As such, the fiber composite sheet drains and repels water away from the base material. In addition to its superior water-management properties, the fiber composite sheet also provides structural support, such as racking strength and lateral strength, between vertical studs. The fiber composite sheet further exhibits superior thermal resistance, which helps maintain interior temperatures throughout a building. After being adhered to the base material, a finishing material, such as tile, can be bonded to the side of the fiber core opposite the side with the surface layer.

The fiber composite sheets, which are configured together to form a continuous water drainage and repellant layer, can be used in various areas of a building or house. For instance, the fiber composite sheets can be applied to a shower system, to a wall as an exterior sheathing layer, or to an outside portion of a foundation for a building.

In certain embodiments, the present invention is also directed to a shower assembly that utilizes the fiber composite sheets as a water-management substrate. The assembly includes a wall, a floor, optionally a seat, and a plurality of fiber composite sheets attached to the wall, seat, and/or floor where adjacent fiber composite sheets are connected together by the lapped configuration to form a continuous water drainage and repellant layer. Further, a sheathing material, such as plywood, oriented strand board, drywall, and backerboard can first be placed over the construction materials that form the framing of the wall.

The fiber composite sheets can be attached to the wall, floor, and/or seat with an adhesive material and/or a fastener. A finishing material, such as tile, can be attached and/or adhered to the fiber composite sheets that are attached to the wall, seat, and/or floor of the shower system. In certain embodiments, the fiber composite sheets attached to the floor can have a thickness greater than the thickness of the fiber composite sheets attached to the wall and seat.

DETAILED DESCRIPTION OF THE INVENTION

Figure 1:
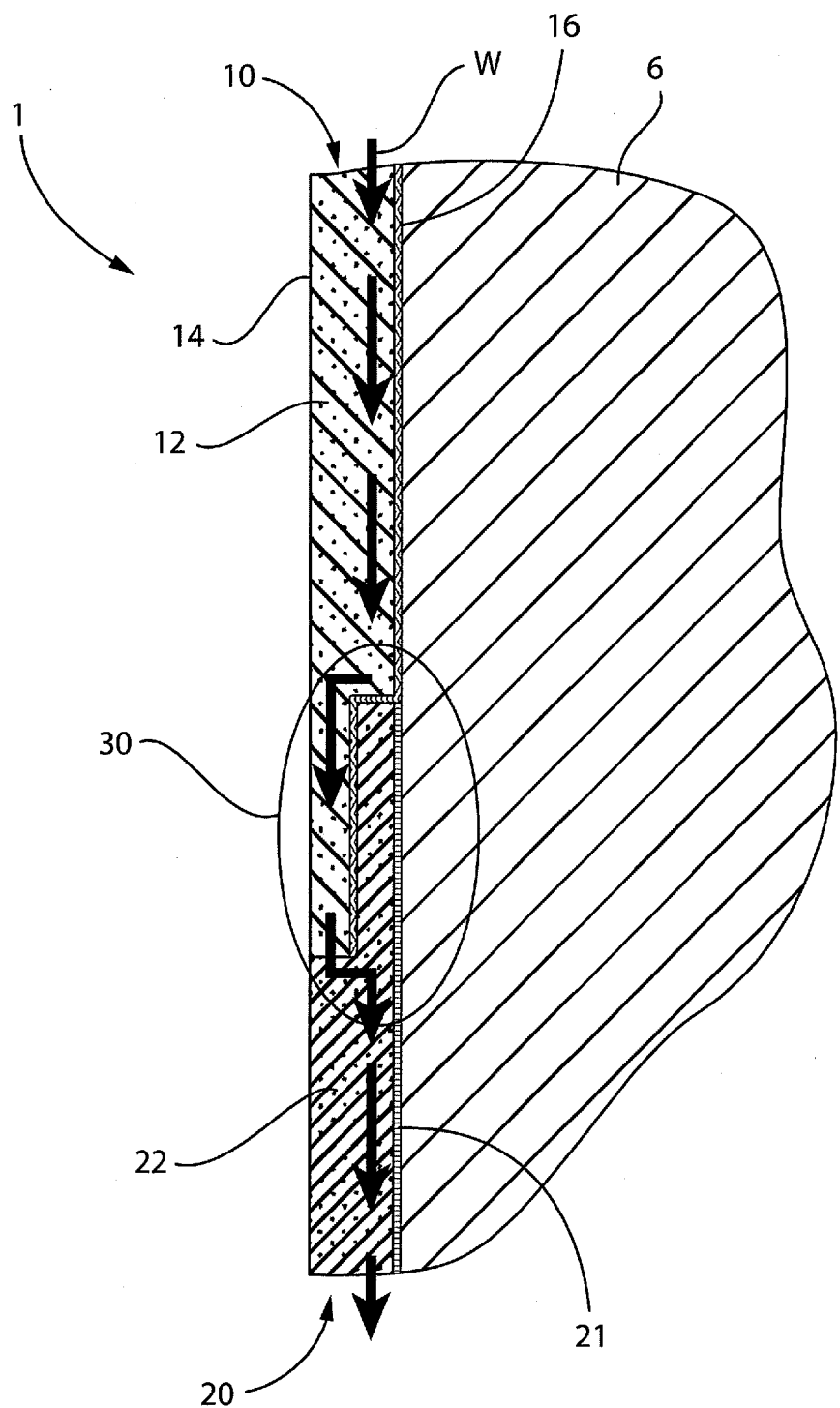
FIG. 1 illustrates a cross-sectional view of a water-management system with fiber composite sheets attached to a base material and connected together by a lapped configuration in accordance with an embodiment of the present invention.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, in certain embodiments as shown in FIG. 1, a water-management system 1 includes fiber composite sheets 10, 20 attached to a surface of a base material 6 that can be used to form various structures in the construction industry including buildings, walls, floors, counters, and the like. FIG. 1 illustrates a first fiber composite sheet 10 connected to a second adjacent fiber composite sheet 20, which are both attached to the base material 6. Non-limiting examples of typical base materials 6 used in the formation of such structures include wood, tile, plastics, metals, concrete, concrete blocks, stucco, any of these materials having a coating such as paint, and the like.

Figure 2:
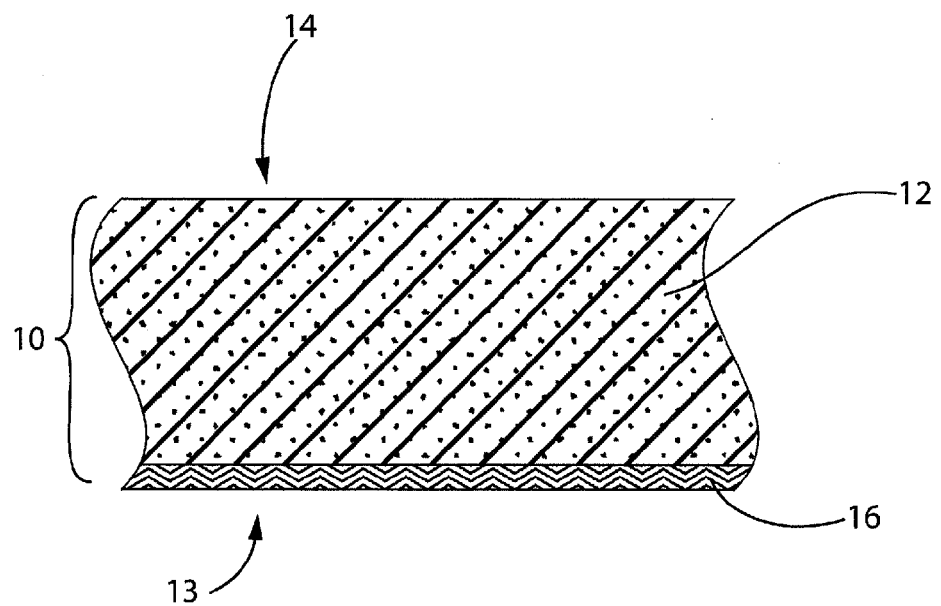
FIG. 2 illustrates a cross-sectional view of a fiber composite sheet in accordance with an embodiment of the present invention.

Referring to FIG. 2, in certain embodiments, the fiber composite sheet 10 includes a fiber core 12 with a first side 13 and an opposing second side 14. A surface layer 16 may be attached to at least the first side 13 of the fiber core 12. The fiber core 12 includes fiber materials that form a porous matrix. As used herein, the term "fiber material" refers to any material that has a fibrous component as a basic structural feature. The term encompasses continuous and non-continuous fibers. Non-limiting examples of fiber materials that can be used to form the porous matrix include, but are not limited to, inorganic fibers, metal fibers, glass fibers, plastic fibers including polyester fibers, graphite fibers, carbon fibers, ceramic fibers, mineral fibers, natural fibers, such as kenaf fibers, jute fibers, flax fibers, hemp fibers, cellulosic fibers, sisal fibers, and coir fibers, and mixtures thereof.

In certain embodiments, the fiber core 12 includes at least one resin that is incorporated into the porous fiber matrix. As used herein, the term "resin" refers to any of a number of physically polymerized synthetics or chemically modified natural resins including thermoplastic materials and thermosetting materials. Non-limiting examples of resins that can be incorporated into the porous fiber matrix of the fiber core 12 include, but are not limited to, polyolefins, such as polyethylene, polypropylene, and polybutylene, polystyrene, acrylonitrylstyrene, polyesters, polyvinyl chloride, acrylics, polycarbonates, and mixtures thereof. The fibers and resins of the fiber core 12 can be orientated and arranged in various manners and in different amounts to produce a durable and resilient material. The density of the fiber core 12 can also be varied to alter the properties of the fiber core 12.

As indicated above, in certain embodiments, the fiber composite sheet 10 may include at least one surface layer 16 attached to at least a portion of the first side 13 of the fiber core 12 (see FIG. 2). The surface layer 16 can be attached to at least a portion of the first side 13 of the fiber core 12 through any technique known in the art including, but not limited to, adhesive bonding. The surface layer 16 can be made of a variety of materials. Non-limiting examples of materials that can be used to form the surface layer 16 include, but are not limited to, thermoplastic elastomers, silicones, polypropylene, polyethylene, polycarbonates, polyurethanes, a thermosetting coating, an inorganic coating, and mixtures thereof. In certain embodiments, the surface layer comprises a housewrap. As used herein, "housewrap" refers to a weather resistant material that prevents water from passing through, but still allows water vapor to pass through. Non-limiting examples of commercially available housewraps that can be used as the surface layer 16 of the fiber composite sheet include Tyvek® commercially available from DuPont™, WEATHER-MATE™ Plus commercially available from Dow®, and Typar® commercially available from DuPont™. Other non-limiting examples of materials that can be used to form the fiber core 12 and/or surface layer 16 of the fiber composite sheet 10 are described in United States Patent Application Publication Nos. 2006/0240242, 2006/0240235, 2006/0099393, and 2005/0228108, all of which are incorporated herein by reference in their entireties.

The fiber composite sheet 10 described herein can capture and direct water to a desired area such as an area where a drain is located. Particularly, when water is applied to the fiber composite sheet 10, water is captured and enters the exposed second side 14 of the fiber core 12. The water is then drained through the fiber core 12 to the surface layer 16 where it is repelled away from the surface layer 16. Thus, the fiber composite sheet 10 can be used to drain and direct water to a desired area, thereby minimizing or preventing water damage to the base materials 6 used in the construction industry.

Further, in certain embodiments, multiple fiber composite sheets 10 are connected together to form a continuous water drainage and repellant layer over various areas of a building, such as walls, floors, and the like. As such, fiber composite sheets 10 are connected together so water and other liquids cannot drain or flow between connected fiber composite sheets 10.

Referring to FIG. 1, it was found that adjacent fiber composite sheets 10, 20 can be connected together by a lapped configuration 30 to form a continuous water drainage and repellant layer over various areas of a building. As shown in FIG. 1, the lapped configuration 30 can be formed such that when attached to the base material 6, the surface layer 16 of the fiber composite sheet 10 extends from the base material 6 and onto a portion of a fiber core 22 of the second adjacent fiber composite sheet 20. The surface layer 16 of the first fiber composite sheet 10 is able to extend over and onto the fiber core 22 of the second adjacent fiber composite sheet 20 without altering the water-management properties of the first or second fiber composite sheets 10, 20. As further illustrated in FIG. 1, at least a portion of the fiber core 12 of the first composite sheet 10 is aligned next to a portion of the fiber core 22 of the second adjacent fiber composite sheet 20. In certain embodiments, at least a portion of the fiber core 12 of the first fiber composite sheet 10 abuts or contacts a portion of the fiber core 22 of the second fiber composite sheet 20. In addition, referring again to FIG. 1, a surface layer 21 of the second fiber composite sheet 20 extends to a portion of the surface layer 16 of the first fiber composite sheet 10 that is directly attached to the base material 6. As used herein, the phrase "extends to" is meant to include arrangements such as direct abutment (direct contact), substantially adjacent, or minimally spaced apart such that water cannot drain or seep through to neighboring materials.

Thus, in this manner, one portion of surface layer 16 is sandwiched between the base material 6 and the fiber core 12, and in another portion, surface layer 16 is sandwiched between fiber cores 12 and 22. Surface layer 21 is sandwiched between fiber core 22 and base material 6. At lapped configuration 30, fiber cores 12 and 22 at least approach each other and may be directly adjacent each other and surface layers 16 and 21 approach each other and may be immediately adjacent each other.

The lapped configuration 30 (having a stepped structure) directs water to flow from the fiber core 12 of the first composite sheet 10 into the fiber core 22 of the second adjacent fiber composite sheet 20. Thus, by using the lapped configuration 30, a continuous water drainage and repellant layer can be formed over the base material 6, as illustrated by the arrows of reference "W" in FIG. 1. In certain embodiments, flashing tape such as butyl flashing tape, sealant, or a combination thereof, can be applied to the lapped configuration 30 to further ensure that water or other liquids do not flow between adjacent fiber composite sheets 10, 20.

As will be appreciated, by using the lapped configuration 30, a plurality of fiber composite sheets 10, 20 can be placed throughout a building to direct and control the flow of water. For example, FIG. 1 further shows the flow of water (reference "W") through the connected fiber composite sheets 10, 20 as if aligned in a vertical direction, such as if aligned vertically along the wall of a building. In these embodiments, the surface layer 16 of the first fiber composite sheet 10 extends in a downward vertical direction between fiber core 12 and a portion of the fiber core 22 of the adjacent second fiber composite sheet 20. By aligning (positioning) a portion of the fiber core 12 of the first composite sheet 10 next to a portion of the fiber core 22 of the second fiber composite sheet 20 through lapped configuration 30, water (W) can flow downward in a vertical direction through the fiber cores 12, 22 in a designed path. It is noted that the alignment of connected fiber composite sheets 10, 20 is not limited to the embodiment shown in FIG. 1. For example, adjacent fiber composite sheets 10, 20 can be aligned so that the lapped configuration 30 is formed in a horizontal direction along the wall of a building.

Figure 3:
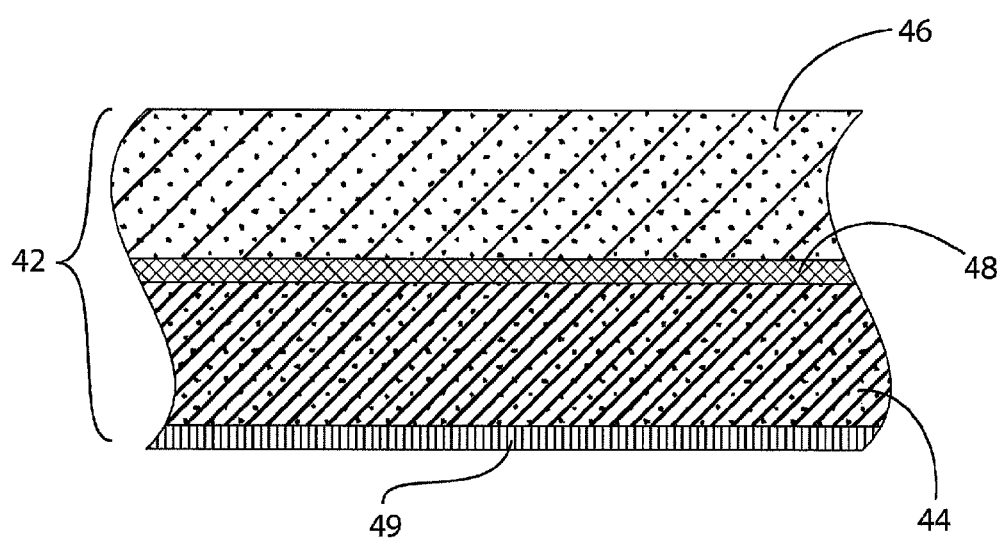
FIG. 3 illustrates a cross-sectional view of a multi-layered fiber composite sheet in accordance with an embodiment of the present invention.

In another embodiment, the present invention includes at least one multi-layer fiber composite sheet 42. Referring to FIG. 3, the multi-layer fiber composite sheet 42 can comprise a first fiber core 44, a second fiber core 46, a first surface layer 48 positioned between fiber cores 44 and 46, and a second surface layer 49 attached to the first fiber core 44 opposite the side of the first surface layer 48.

Figure 4:
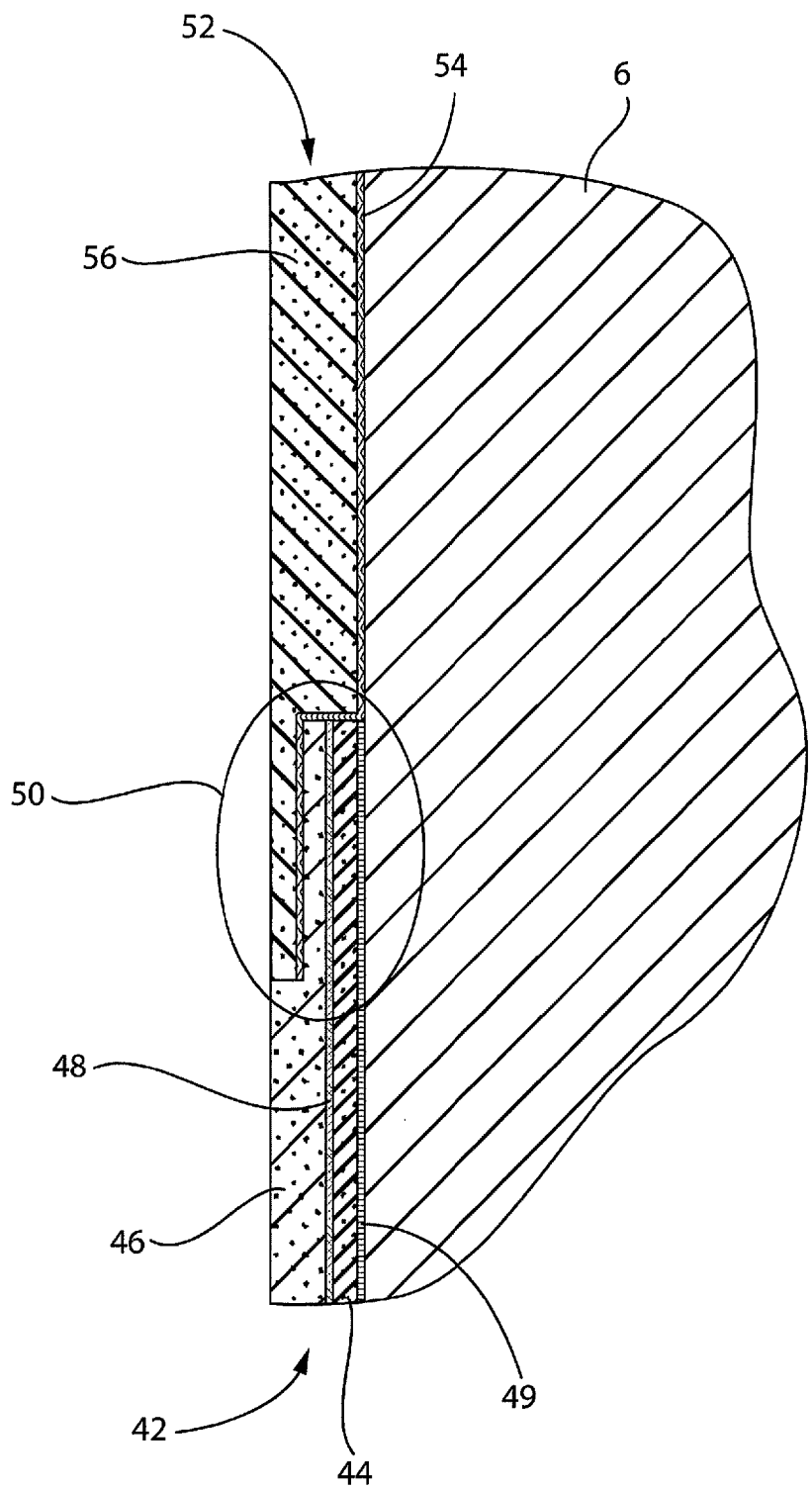
FIG. 4 illustrates a cross-sectional view of a single-layered and multi-layered fiber composite sheet attached to a base material and connected together by a lapped configuration in accordance with an embodiment of the present invention.

As shown in FIG. 4, a water-management system 40 according to one embodiment of the present invention can include the multi-layer fiber composite sheet 42 connected by a lapped configuration 50 to a single-layered fiber composite sheet 52 (similar to fiber composite sheet 10), and attached to the base material 6. As shown in FIG. 4, the lapped configuration 50 can be formed such that when attached to the base material 6, the surface layer 54 of the single-layered fiber composite sheet 52 extends from the base material 6 and onto the second fiber core 46 of the multi-layer fiber composite sheet 42. As further illustrated in FIG. 4, a fiber core 56 of the single-layered fiber composite sheet 52 can be aligned next to, and optionally contacts or abuts, at least the second fiber core 46 of the multi-layer fiber composite sheet 42. Further, the second surface layer 49 of the multi-layer fiber composite sheet 42 can extend to a portion of the surface layer 54 of the single-layered fiber composite sheet 52 that is attached to the base material 6. In certain embodiments, the first surface layer 48 of the multi-layer fiber composite sheet 42 can extend to the surface layer 54 of the single-layered fiber composite sheet 52 that extends away from the base material 6. The lapped configuration 50 described herein allows water to flow continuously from the fiber core 56 of the single-layered fiber composite sheet 52 into at least the second fiber core 46 of the multi-layered fiber composite sheet 42. Thus, by using the lapped configuration 50 illustrated in FIG. 4, a continuous water drainage and repellant layer can be formed over the base material 6. In certain embodiments, flashing tape, such as butyl flashing tape, sealant, or a combination thereof can be applied to the lapped configuration 50.

In certain embodiments, the fiber composite sheets 10 and/or multi-layer fiber composite sheets 42 that are connected together through lapped configurations 30 or 50 can have the same thickness (see FIGS. 1 and 4). Alternatively, in other embodiments, the fiber composite sheets 10 and/or multi-layer fiber composite sheets 42 connected together through lapped configurations 30 or 50 can have different thicknesses.

Further, any of the fiber composite sheets 10 and/or multi-layer fiber composite sheets 42 described herein can be attached to the base material 6 through various methods known in the art. For example, referring to FIG. 5, the adjacent fiber composite sheets 10, 20 shown in FIG. 1 can be attached to the base material 6 with the use of a fastener 62 such as a screw. In certain embodiments, the fastener 62 can be placed through the lapped configuration 30. The use of the fastener 62 is particularly useful for securing fiber composite sheets 10, 20 to a wall or ceiling. Alternatively, in other embodiments, an adhesive material can be spread over at least a portion of the base material 6 prior to attaching the fiber composite sheets 10, 20. Non-limiting examples of adhesive materials that can be used include polyurethane adhesives, silicone adhesives, anaerobic adhesives, cyanoacrylate adhesives, urethane adhesives, acrylic adhesives, epoxy adhesives, hot melt adhesives, rubber adhesives, contact bond adhesives, and mixtures thereof.

Figure 5:
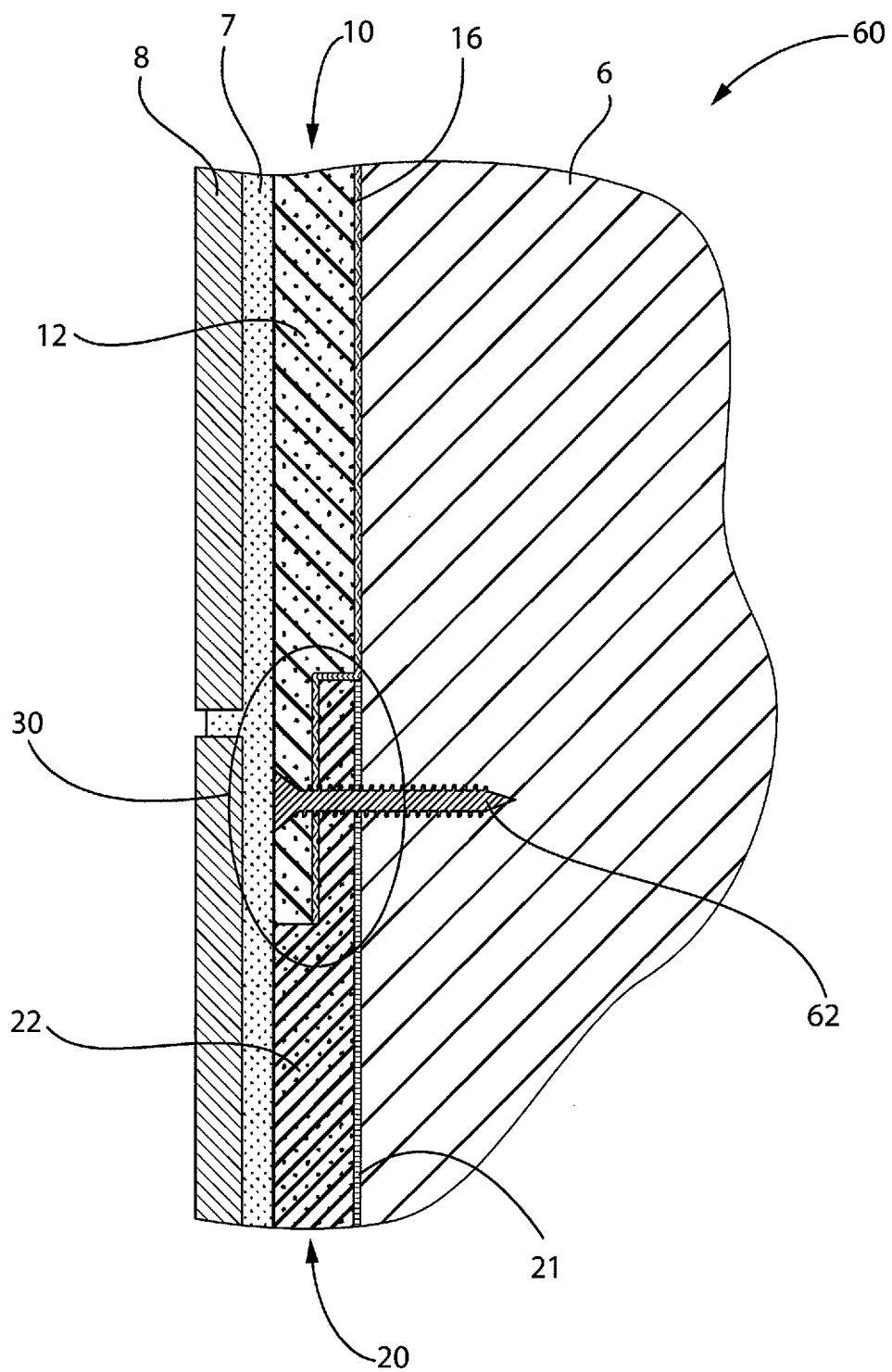
FIG. 5 illustrates a cross-sectional view of a water-management system with fiber composite sheets attached to a base material with a fastener in accordance with an embodiment of the present invention.

As further shown in FIG. 5, the water-management system 60 can also include a construction finishing material 8 (such as tile) that can be placed over the fiber cores 12, 22 to form a solid barrier over the fiber composite sheets 10, 20. In certain embodiments, tile 8 can be bonded onto the fiber composite sheets 10, 20 with the use of a bonding material 7 such as, but not limited to, thin-set mortar.

Figure 6:
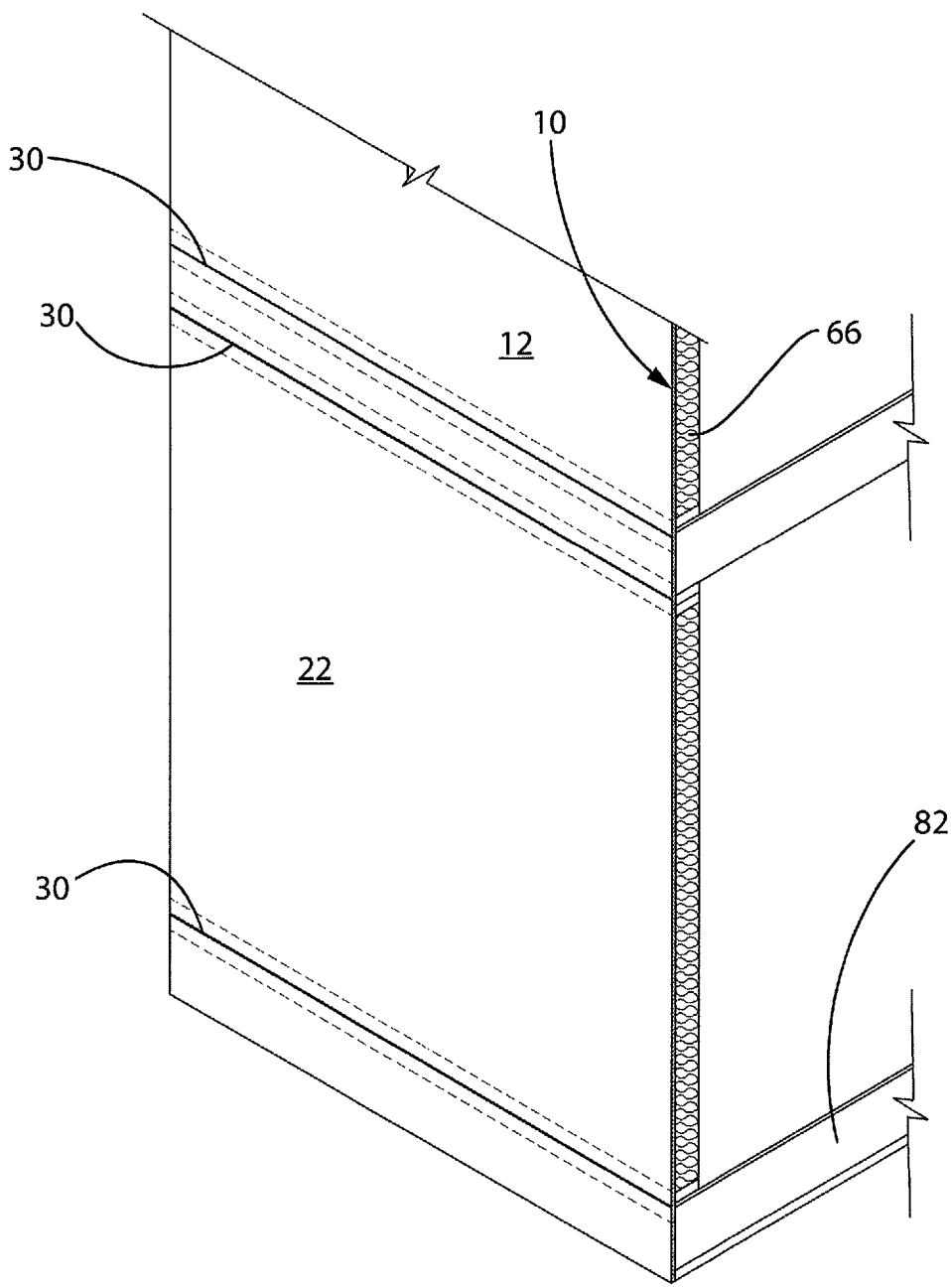
FIG. 6 illustrates a perspective view of fiber composite sheets attached to base materials of a building as a sheathing layer in accordance with an embodiment of the present invention.

The fiber composite sheets 10 and/or multi-layer fiber composite sheets 42 connected by the lapped configurations 30 or 50 can also be applied as an exterior sheathing layer. For example, as shown in FIG. 6, the adjacent fiber composite sheets 10, 20 shown in FIG. 1 can be attached to a base material 66, such as a stud, that forms the outside framing of a building. Exterior wall paneling, such as metal wall panels, can then be applied to the exposed fiber cores 12, 22 of the fiber composite sheets 10, 20.

Figure 7:
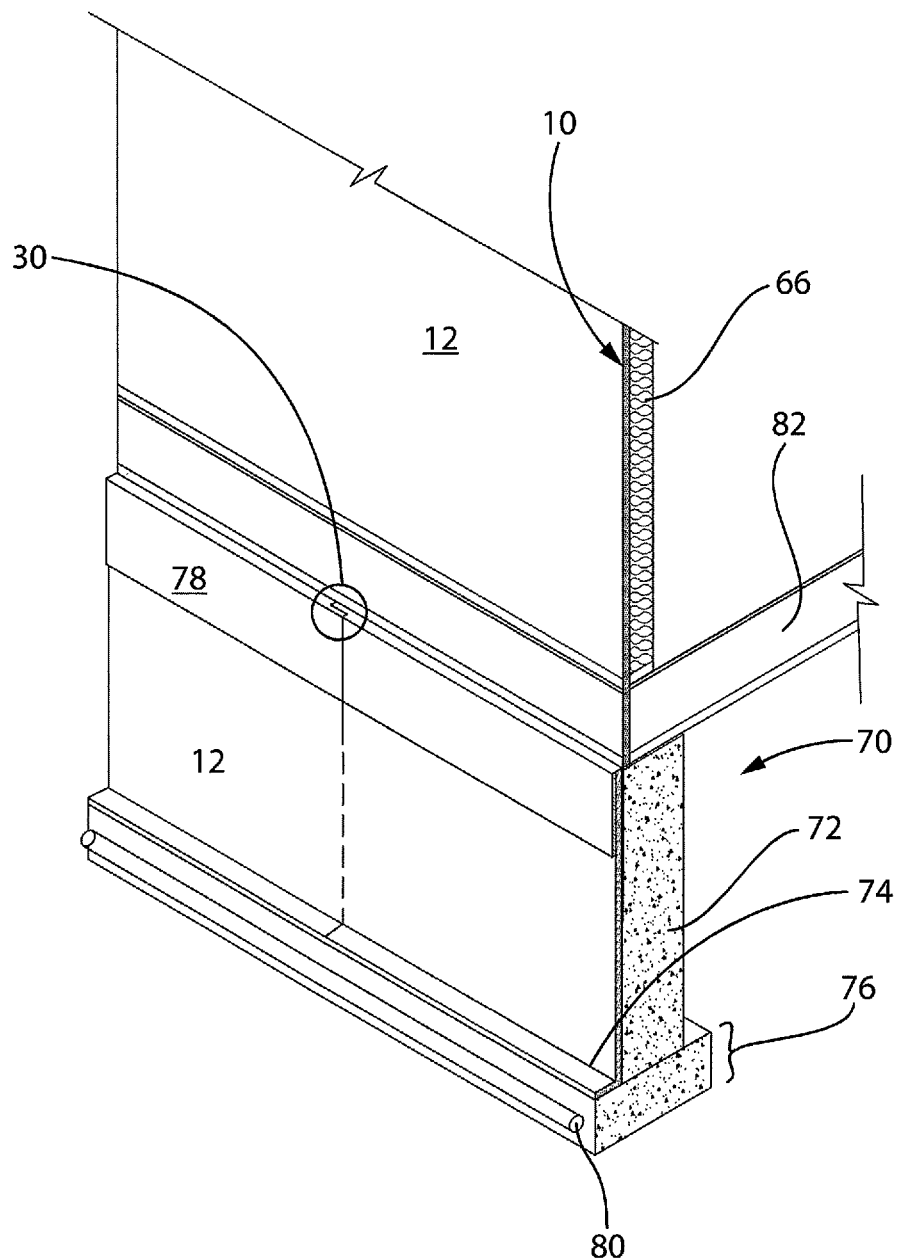
FIG. 7 illustrates a perspective view of fiber composite sheets attached to base materials of a building as a sheathing layer and to base materials that form the foundation of a building in accordance with an embodiment of the present invention.
Figure 8:
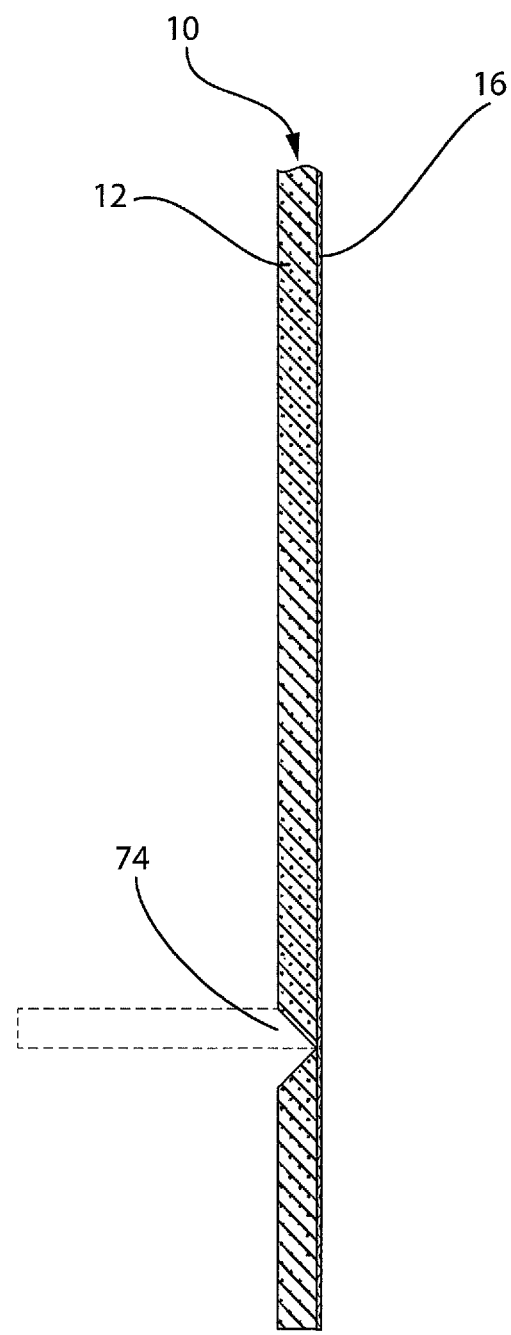
FIG. 8 illustrates a cross-sectional view of a fiber composite sheet with a kerf in accordance with an embodiment of the present invention.

In certain embodiments, the fiber composite sheets 10 and/or multi-layer fiber composite sheets 42 connected by the lapped configurations 30 or 50 can be applied to an outside of a foundation 70 for a building. For example, as shown in FIG. 7, the adjacent fiber composite sheets 10, 20 of FIG. 1 can be attached to a base material 72 that forms the foundation 70 of a building. In some of these embodiments, the fiber composite sheets 10 can be manufactured with a kerf 74 so that the fiber composite sheet 10 can bend and fit on top of a footing 76 of the foundation 70. As used herein, a "kerf" refers to a cut or incision in the fiber composite sheet 10 that extends through the fiber core 12 but which does not penetrate the surface layer 16. FIG. 8 illustrates a side cross-sectional view of the fiber composite sheet 10 of FIG. 2 with a kerf 74 extending through the fiber core 12. As indicated, the kerf 74 allows the fiber composite sheet 10 to bend, such as at a 90° angle. Gravel, dirt and the like can then be deposited around a portion of the foundation 70.

Referring again to FIG. 7, a coating layer 78 can be applied over the exposed side of the fiber cores 12 that cover a portion of the foundation 70 that is above and just below ground level. In other embodiments, the coating layer 78 is applied over the entire surface of the fiber cores 12 before depositing gravel and dirt. The coating layer 78 can be used for decorative and/or functional purposes. For instance, the coating layer 78 can include, but is not limited to, paint, stucco, anti-glare coatings, abrasion resistant coatings, chemical resistant coatings, water resistant coatings, and mixtures thereof. When water and other liquids flow into the foundation 70 of the building, they are captured and directed away to a drain 80 by the fiber composite sheets 10.

In certain embodiments, the fiber composite sheets 10 can extend from the foundation 70 of a building and onto the base material 66 that forms the framing of the building. An example of such an embodiment is shown in FIG. 7 where the fiber composite sheets 10 extend from the foundation 70 of a building, past a flooring 82 of the building, and onto the base material 66 that forms the framing of the building.

In addition to the water-management properties described above, the fiber composite sheets 10 and multi-layer fiber composite sheets 42 connected by the lapped configurations 30, 50 described herein exhibit other properties useful in the construction industry. For instance, it has been found that the fiber and multi-fiber composite sheets 10, 42 provide structural support. Specifically, when attached to the surface of the base material 6, the fiber composite sheets 10 and multi-layer fiber composite sheets 42 connected by the lapped configurations 30, 50 provide structural racking strength and lateral strength between vertical studs. The fiber composite sheets 10 and multi-layer fiber composite sheets 42 connected by the lapped configurations 30, 50 also have superior thermal resistance. As used herein, "thermal resistance" refers to the ability of a material to resist heat flow. As a result, the fiber composite sheets 10 and multi-layer fiber composite sheets 42 connected by the lapped configurations 30, 50 can help insulate a building. It was also found that the fiber composite sheets 10 and multi-layer fiber composite sheets 42 exhibit good adhesion to base materials 6.

Figure 9:
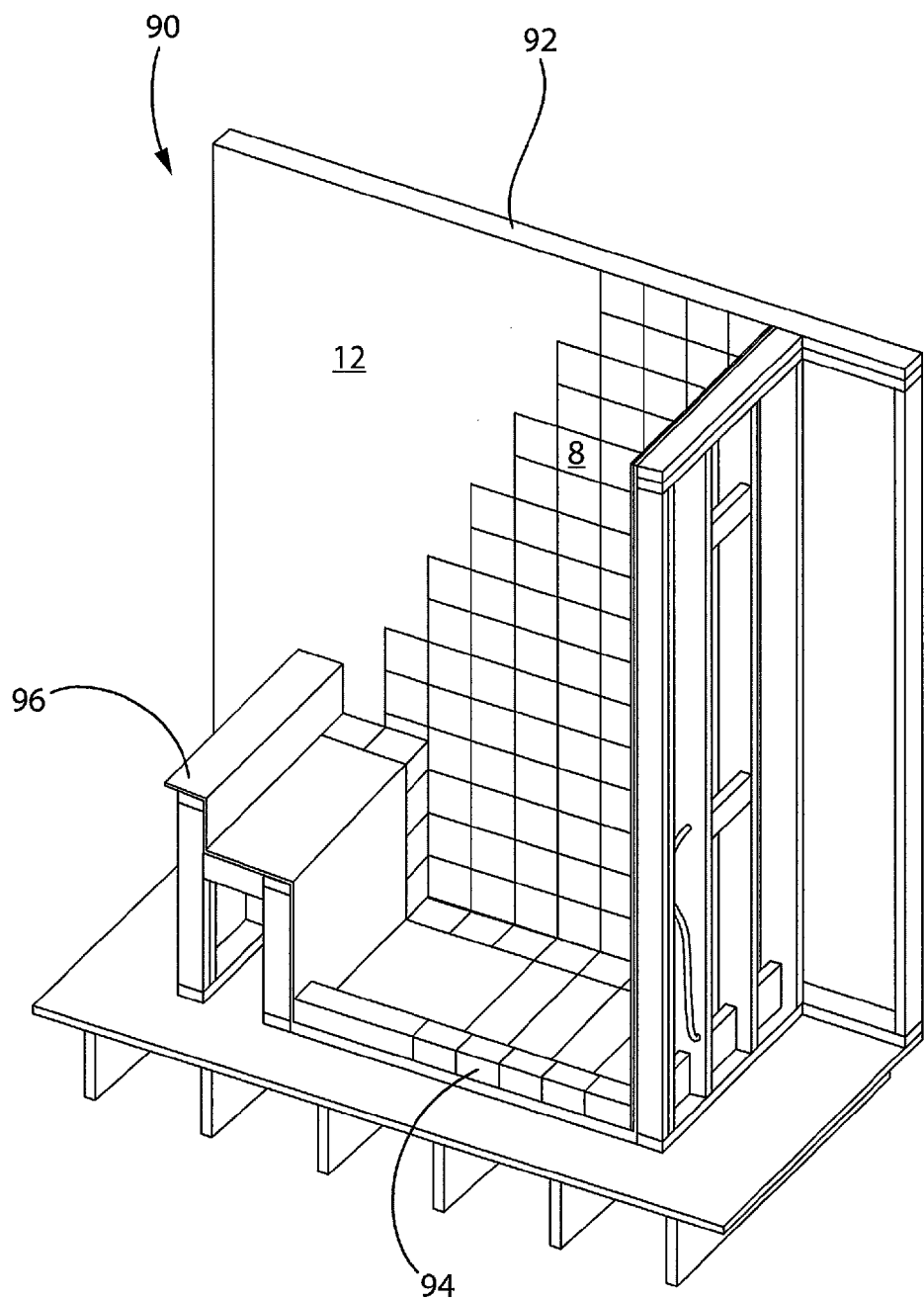
FIG. 9 illustrates a perspective cut-away view of a shower assembly in accordance with an embodiment of the present invention.

As indicated, the present invention is also directed to a shower assembly 90. As shown in FIG. 9, the shower assembly 90 includes a wall 92, a floor 94, and optionally, a seat or bench 96. In accordance with the present invention, fiber composite sheets 10 and/or multi-layer fiber composite sheets 42 can be attached to the wall 92, floor 94, and/or seat 96 as a water-management substrate. FIG. 9 shows a cutaway of the shower assembly 90 with exposed fiber cores 12 of the fiber composite sheets 10 of FIG. 2 attached to the wall 92, floor 94, and seat 96. FIG. 9 also illustrates the finishing material 8, such as tile, attached to a portion of the exposed fiber cores 12 of the fiber composite sheets 10.

In certain embodiments, such as is shown in FIG. 5, the fastener 62, such as a screw, nail, or the like, can be used to attach fiber composite sheets 10, 20 to the base material 6 that forms the framing of the wall 92. Alternatively, in other embodiments, an adhesive material can be spread over the base material 6 prior to attaching the fiber composite sheets 10, 20 to the wall 92. In certain embodiments, the fiber composite sheets 10, 20 attached to the wall 92 of the shower 90 have a thickness of 1/16 inch to 1/2 inch. As further shown in FIG. 5, the finishing material 8, such as tile, can be bonded onto the exposed side of the fiber cores 12 with the use of the bonding material 7 such as, but not limited to, thin-set mortar.

Figure 10:
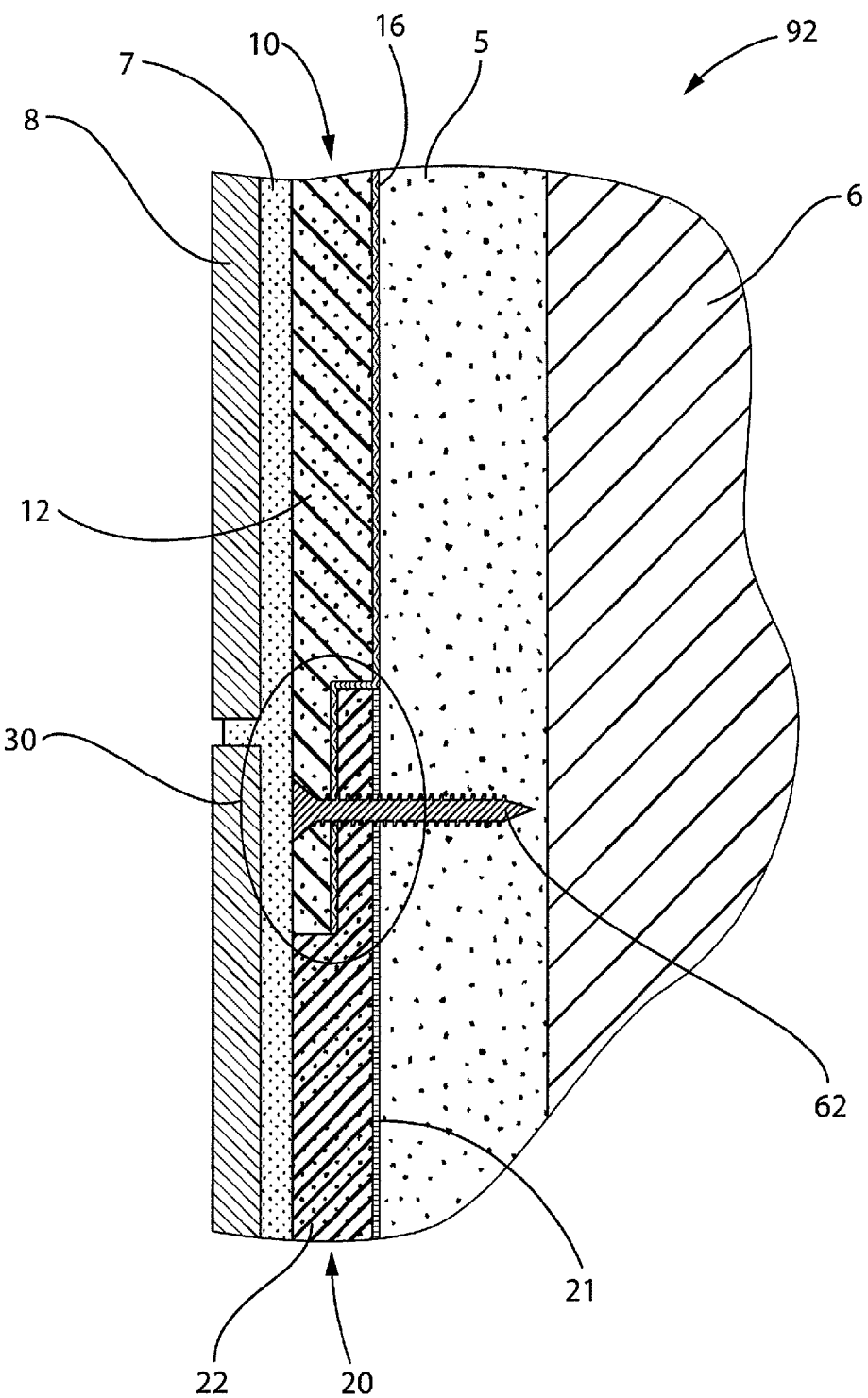
FIG. 10 illustrates a cross-sectional view of fiber composite sheets attached to the wall of a shower having a sheathing layer in accordance with another embodiment of the present invention.

Referring to FIG. 10, in certain embodiments, a sheathing material 5 is first placed over the base materials 6 that form the framing of the wall 92. Non-limiting examples of sheathing materials 5 that can be used include plywood, oriented strand board, drywall, backerboard, and the like. After attaching the sheathing material 5 to the wall 92, the surface layers 16 of the fiber composite sheets 10, 20 are attached to the sheathing material 5 such as with a fastener as shown in FIG. 10 or with an adhesive as described above. The finishing material 8, such as tile, can then be bonded onto the fiber composite sheets 10, 20 with the use of a bonding material 7 such as, but not limited to, thin-set mortar.

Figure 11:
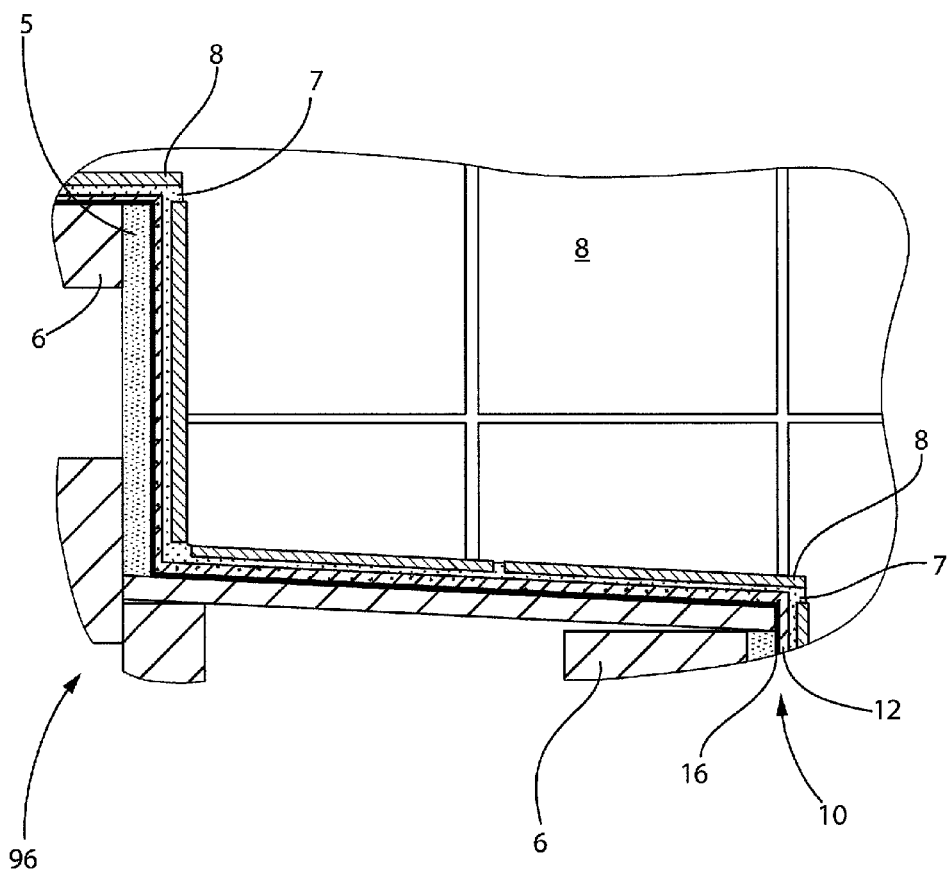
FIG. 11 illustrates a cross-sectional view of a fiber composite sheet attached to the seat of a shower in accordance with an embodiment of the present invention.

FIG. 11 shows one embodiment of the present invention in which the fiber composite sheets 10 of FIG. 2 is attached to the base materials 6 that form the seat 96 of the shower 90. For example, the surface layer 16 of a fiber composite sheet 10 can be attached with the use of an adhesive material to the base material 6 that forms the seat 96. The fiber composite sheet 10 can be adjusted to fit varying dimensions and stepped areas of the seat 96 such as with the use of a kerf 74. The fiber composite sheet 10 attached to the seat 96 can extend to fiber composite sheets 10 and/or multi-layer fiber composite sheets 42 attached to the wall 92 and floor 94 of the shower 90, and connected together by the lapped configuration 30 or 50. In certain embodiments, multiple fiber composite sheets 10 and/or multi-layer fiber composite sheets 42 are used to form a water drainage and repellant layer over the seat 96. The fiber composite sheets 10 and/or multi-layer fiber composite sheets 42 that are attached to the seat 96 of the shower 90 can have a thickness from 1/16 inch to 1/4 inch.

During assembly of the shower seat 96, adhesive material can be spread over the construction materials 6 that form the seat 96. The surface layers 16 of the fiber composite sheets 10 are attached to the base materials 6 that form the seat 66 so that one side of the porous matrix of the fiber core 12 is exposed. A finishing material 8, such as tile, can then be bonded onto the exposed side of the fiber cores 12 with the use of a bonding material 7 such as, but not limited to, thin-set mortar (see FIG. 11).

As further shown in FIG. 11, a sheathing material 5 can be placed over the construction materials 6 that form the vertical portions of the seat 96. After attaching the sheathing material 5, the surface layers 16 of the fiber composite sheets 10 can be attached to the sheathing material 5 such as with a fastener 62 or with an adhesive as described above. A finishing material 8, such as tile, can then be bonded onto the fiber composite sheets 10 with the use of a bonding material 7 such as, but not limited to, thin-set mortar.

Figure 12:
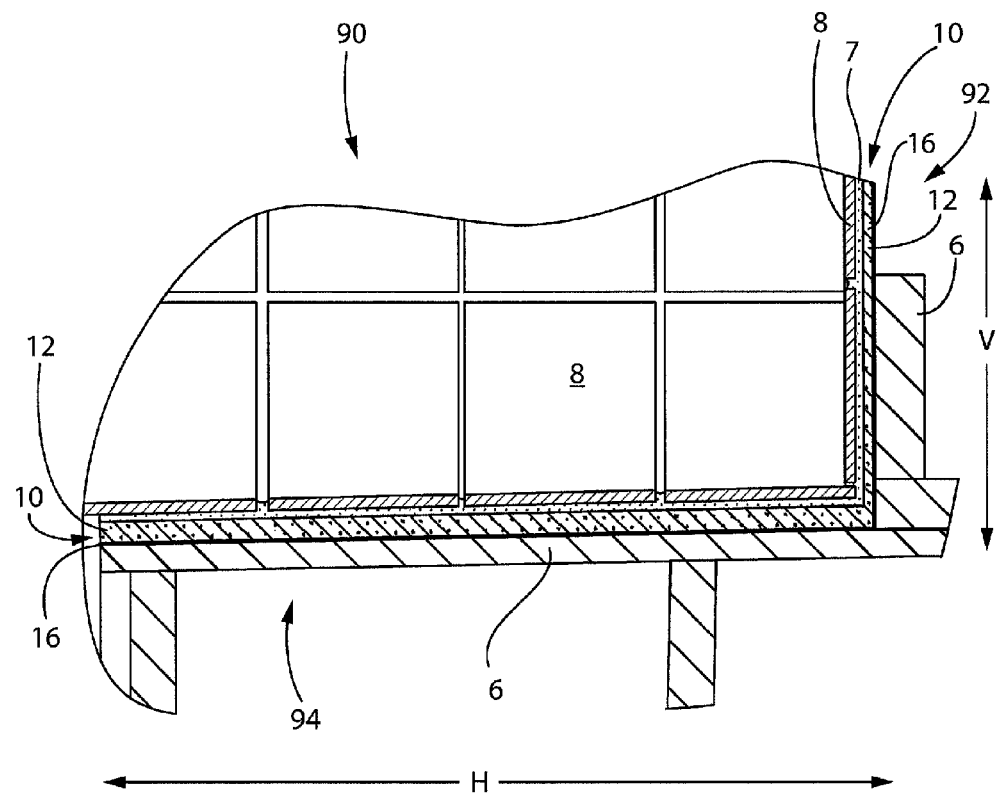
FIG. 12 illustrates a cross-sectional view of a fiber composite sheet attached to the floor and a portion of the wall of a shower in accordance with an embodiment of the present invention.

FIG. 12 shows another embodiment of the present invention in which the fiber composite sheet 10 of FIG. 2 is attached to the base materials 6 that form the floor 94 of the shower 90. For example, as shown in FIG. 12, the surface layer 16 of the fiber composite sheet 10 can be attached to the base material 6 that forms the floor 94 of a shower 90. In certain embodiments, a single fiber composite sheet 10 can be configured to cover the entire surface of the floor 94. Alternatively, multiple fiber composite sheets 10 and/or multi-layer fiber composite sheets 42 are used to form a water drainage and repellant layer over the floor 94. In certain embodiments, as shown in FIG. 12, the fiber composite sheet 10 can extend over the entire horizontal area (reference letter "H") of the floor 94 and extend vertically upward onto a vertical portion (reference letter "V") of the wall 92 (and optionally seat 96), thereby forming the shower pan. The fiber composite sheet 10 attached to the floor 94 can be connected to the fiber composite sheets 10 and/or multi-layer fiber composite sheets 42 of the wall 92 and/or seat 96 by the lapped configurations 30 or 50. In certain embodiments, referring to FIG. 13, the vertical portion (V) that extends upward from the horizontal portion (H) can abut the sheathing material 5 that is attached to the wall 92 (and optionally seat 96) of the shower 90. The fiber composite sheet 10 that is attached to the floor 94 of the shower system can have a thickness of 1/16 inch to 1 1/2 inch.

Figure 14:
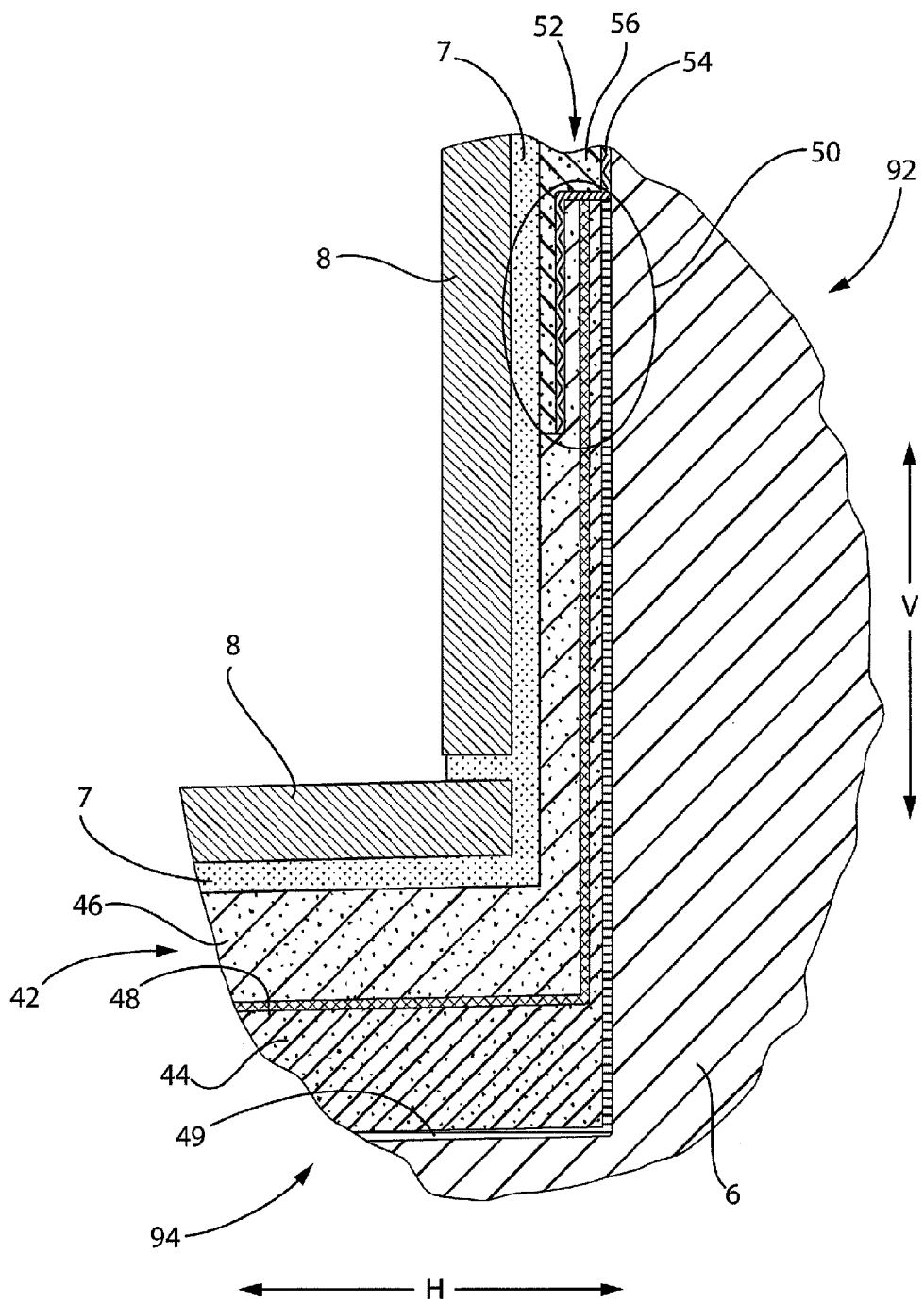
FIG. 14 illustrates a detailed cross-sectional view of fiber composite sheets connected together attached to the floor and wall of a shower in accordance with an embodiment of the present invention.

In some embodiments, the thickness of the horizontal portion (H) of the fiber composite sheet 10 and/or multi-layer fiber composite sheet 42 attached to the floor 94 is greater than the thickness of the vertical portion (V). In certain embodiments, the thickness of the horizontal portion (H) of the fiber composite sheet 10 and/or multi-layer fiber composite sheet 42 attached to the floor 94 is also greater than the thickness of the fiber composite sheet 10 and/or multi-layer fiber composite sheet 42 attached to the wall 92 and seat 96. FIG. 14 shows a detailed cross-sectional view of the multi-layer fiber composite sheet 42 of FIG. 3 attached to the floor 94 of the shower 90. As shown in FIG. 14, the horizontal portion (H) of the multi-layer fiber composite sheet 42 is thicker than the vertical portion (V) of the multi-layer fiber composite sheet 42. As further shown in FIG. 14, the vertical portion (V) of the multi-layer fiber composite sheet 42 can be connected to the single layered fiber composite sheet 52 that is attached to the wall 92 of the shower through the lapped configuration 50 as further illustrated in FIG. 4 and described above.

Figure 13:
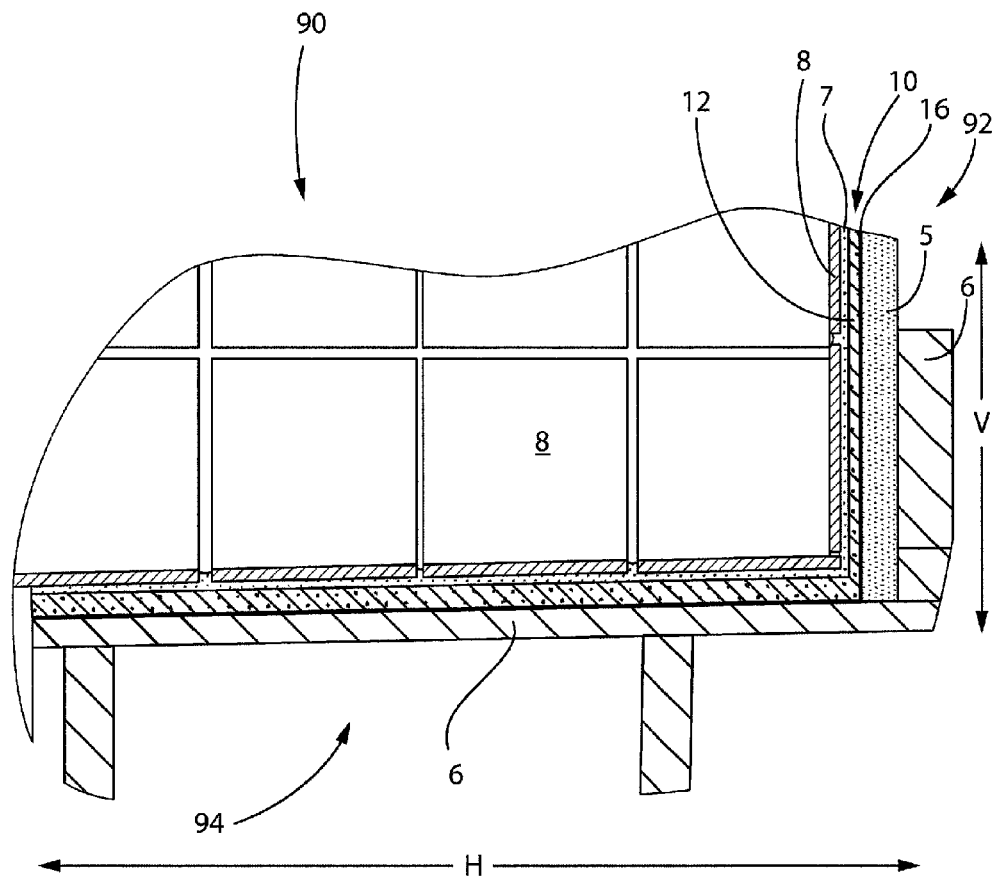
FIG. 13 illustrates a cross-sectional view of a fiber composite sheet attached to the floor and a portion of the wall of a shower with a sheathing material in accordance with another embodiment of the present invention.

During assembly of the floor 94, an adhesive material can be spread over the base material 6 that forms the shower floor 94 and a portion of the wall 92. A fastener 62 can also be used. The surface layers 16 of a fiber composite sheet 10 or multi-layer fiber composite sheet 42 can be attached to the base materials 6 that form the floor 94 so that one side of the porous matrix of the fiber core 12 is exposed. The finishing material 8, such as tile, can then be bonded onto the fiber composite sheet 10 or multi-layer fiber composite sheet 42 with the use of the bonding material 7 such as, but not limited to, thin-set mortar (see FIGS. 12-14). Further, in certain embodiments, the fiber composite sheet 10 or multi-layer fiber composite sheet 42 can be sloped inward toward a central drain. For example, although the fiber composite sheet 10 and multi-layer fiber composite sheet 42 shown in FIGS. 12-14 are planar, the fiber cores 16, 44, 46 of the fiber composite sheet 10 and multi-layer fiber composite sheet 42 shown in FIGS. 12-14 can instead be sloped such as being tapered or as having a triangular sloping arrangement.

As indicated, the fiber composite sheets 10 and multi-layer fiber composite sheets 42 used in the shower 90 provide an improved substrate for draining and repelling water. By using the lapped configurations 30, 50 described herein, a continuous water drainage and repellant layer is formed throughout the entire shower system 90, thereby preventing water damage to the base materials 6 that form the wall 92, floor 94, and seat 96 of the shower 90. The fiber composite sheets 10 and multi-layer fiber composite sheets 42 also provide good thermal resistance and structural stability to the shower 90.

The fiber composite sheets 10 and multi-layer fiber composite sheets 42 can be used in other construction systems as well. For example, the fiber composite sheets 10 and multi-layer fiber composite sheets 42 can be used in floors, counters, and other surfaces located throughout various areas of a building or house.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the description. For example, it is to be understood that the present invention contemplates that, to the extent possible, one or more features of any embodiment can be combined with one or more features of any other embodiment.

The invention claimed is:

1. A building water-management system comprising:
a base material; and
fiber composite sheets attached to the base material, each fiber composite sheet comprising a fiber core having a first side, an opposing second side, and a surface layer adhered to the first side of the fiber core,
wherein adjacent fiber composite sheets are connected together by a lapped configuration such that the surface layer of a first fiber composite sheet extends from the base material and onto a fiber core of an adjacent second fiber composite sheet and the fiber cores of the first and second fiber composite sheets are aligned next to each other to allow water to flow between the fiber cores, thereby forming a continuous water drainage and repellant layer, and
wherein at least one of the fiber composite sheets is a multi-layered fiber composite sheet comprising a first fiber core, a second fiber core, a first surface layer positioned between the first and second fiber cores, and a second surface layer attached to a side of the first fiber core opposite the first surface layer, and
wherein a single-layered fiber composite sheet with one fiber core and a surface layer is connected to the at least one multi-layered fiber composite sheet by a lapped configuration such that the surface layer of the single-layered fiber composite sheet extends from the base material and onto the second fiber core of the multi-layered fiber composite sheet and the fiber core of the single-layered fiber composite sheet is aligned next to the second fiber core of the multi-layered fiber composite sheet to allow water to flow between the fiber cores, thereby forming the continuous water drainage and repellant layer.

2. The building water-management system according to claim 1, further comprising a finishing material attached to the second side of the fiber core of the fiber composite sheets.

3. The building water-management system according to claim 1, wherein the fiber core comprises a porous fiber matrix and a resin material.

4. The building water-management system according to claim 3, wherein the porous fiber matrix comprises metal fibers, glass fibers, polyester fibers, graphite fibers, carbon fibers, ceramic fibers, mineral fibers, or mixtures thereof.

5. The building water-management system according to claim 3, wherein the resin material comprises polyolefins, polystyrene, acrylonitrylstyrene, polyesters, polyvinyl chloride, acrylics, or mixtures thereof.

6. The building water-management system according to claim 1, wherein the surface layer comprises thermoplastic elastomers, silicones, polypropylene, polyethylene, polycarbonates, polyurethanes, or mixtures thereof.

7. The building water-management system according to claim 1, wherein the surface layer comprises a housewrap.

8. The building water-management system according to claim 1, wherein the base material comprises wood, tile, plastics, metals, stucco, concrete, concrete blocks, or combinations thereof.

9. The building water-management system according to claim 1, wherein a sealant is applied at the lapped configuration between adjacent fiber composite sheets.

10. The building water-management system according to claim 1, wherein the fiber composite sheets are applied to a building as an exterior sheathing layer, to a foundation for a building, to a shower system, or a combination thereof.

11. The building water-management system according to claim 10, wherein at least one of the fiber composite sheets comprises a kerf allowing the at least one fiber composite sheet to extend over a footing of the foundation.

12. The building water-management system according to claim 10, wherein a coating layer at least partially covers an exposed surface of the fiber cores of the fiber composite sheets attached to a portion of the foundation that extends above ground level.

13. A shower assembly comprising a wall, a floor, and fiber composite sheets attached to the wall and floor, each fiber composite sheet comprising a fiber core having a first side, an opposing second side, and a surface layer attached to the first side of the fiber core,
wherein adjacent fiber composite sheets are connected together by a lapped configuration such that a surface layer of a first fiber composite sheet extends from the wall and/or floor and onto a fiber core of an adjacent second fiber composite sheet and the fiber cores of the first and second fiber composite sheets are aligned next to each other to allow water to flow between the fiber cores, thereby forming a continuous water drainage and repellant layer,
wherein at least one of the fiber composite sheets is a multi-layered fiber composite sheet comprising a first fiber core, a second fiber core, a first surface layer positioned between the first and second fiber cores, and a second surface layer attached to a side of the first fiber core opposite the first surface layer, and
wherein a single-layered fiber composite sheet with one fiber core and a surface layer is connected to the at least one multi-layered fiber composite sheet by a lapped configuration such that the surface layer of the single-layered fiber composite sheet extends from the floor and/or wall and onto the second fiber core of the multi-layered fiber composite sheet and the fiber core of the single-layered fiber composite sheet is aligned next to the second fiber core of the multi-layered fiber composite sheet to allow water to flow between the fiber cores, thereby forming the continuous water drainage and repellant layer.

14. The shower assembly according to claim 13, wherein the fiber core comprises a porous fiber matrix and a resin material.

15. The shower assembly according to claim 14, wherein the porous fiber matrix comprises metal fibers, glass fibers, polyester fibers, graphite fibers, carbon fibers, ceramic fibers, mineral fibers, or mixtures thereof.

16. The shower assembly according to claim 14, wherein the resin material comprises polyolefins, polystyrene, acrylonitrylstyrene, polyesters, polyvinyl chloride, acrylics, or mixtures thereof.

17. The shower assembly according to claim 13, wherein the surface layer comprises thermoplastic elastomers, silicones, polypropylene, polyethylene, polycarbonates, polyurethanes, or mixtures thereof.

18. The shower assembly according to claim 13, further comprising a finishing material attached to the second side of the fiber core of the fiber composite sheet.

19. The shower assembly according to claim 13, further comprising a seat and fiber composite sheets attached to the seat, wherein adjacent fiber composite sheets are connected by the lapped configuration.

20. The shower assembly according to claim 19, wherein the fiber composite sheets attached to the floor have a thickness greater than the thickness of the fiber composite sheets attached to the wall and seat.

21. The shower assembly according to claim 13, wherein the at least one multi-layered fiber composite sheet extends across an entire surface of the floor and vertically onto a portion of the wall, and wherein a single-layered fiber composite sheet with one fiber core and a surface layer is attached to the wall and connected to the at least one multi-layered fiber composite sheet by a lapped configuration such that the surface layer of the single-layered fiber composite sheet extends from the wall and onto the second fiber core of the multi-layered fiber composite sheet, and the fiber core of the single-layered fiber composite sheet is aligned next to the second fiber core of the multi-layered fiber composite sheet to allow water to flow between the fiber cores, thereby forming a continuous water drainage and repellant layer.

* * * * *

UNITED STATES PATENT AND TRADEMARK OFFICE
CERTIFICATE OF CORRECTION

| | | |
|---|---|---|
| PATENT NO. | : 9,499,981 B2 | Page 1 of 1 |
| APPLICATION NO. | : 14/759506 | |
| DATED | : November 22, 2016 | |
| INVENTOR(S) | : Anthony Grisolia | |

It is certified that error appears in the above-identified patent and that said Letters Patent is hereby corrected as shown below:

In the Specification

Column 1, Line 8, after "to" delete "benefit of"

Column 1, Line 10, after "which" delete "is"

Column 1, Line 10, after "in" delete "its"

Signed and Sealed this
Fourteenth Day of February, 2017

Michelle K. Lee
*Director of the United States Patent and Trademark Office*